(12) United States Patent
Fomitchev et al.

(10) Patent No.: US 10,565,573 B2
(45) Date of Patent: Feb. 18, 2020

(54) REPORTED LOCATION CORRECTION SYSTEM

(71) Applicants: Alexei Fomitchev, Foster City, CA (US); Aleksander Epelman, Foster City, CA (US); Nelli Kayton, Foster City, CA (US); Suresh Pulikara, Foster City, CA (US); Mahesh Joshi, Foster City, CA (US); John Wu, Foster City, CA (US); Xiaoxu Lu, Foster City, CA (US)

(72) Inventors: Alexei Fomitchev, Foster City, CA (US); Aleksander Epelman, Foster City, CA (US); Nelli Kayton, Foster City, CA (US); Suresh Pulikara, Foster City, CA (US); Mahesh Joshi, Foster City, CA (US); John Wu, Foster City, CA (US); Xiaoxu Lu, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 374 days.

(21) Appl. No.: 15/150,982

(22) Filed: May 10, 2016

(65) Prior Publication Data

US 2017/0330163 A1 Nov. 16, 2017

(51) Int. Cl.
*G06Q 20/20* (2012.01)
*G06Q 20/40* (2012.01)

(52) U.S. Cl.
CPC .......... *G06Q 20/20* (2013.01); *G06Q 20/409* (2013.01)

(58) Field of Classification Search
CPC ............................. G06Q 20/20; G06Q 20/409
See application file for complete search history.

(56) References Cited

U.S. PATENT DOCUMENTS

| | | | | |
|---|---|---|---|---|
| 9,280,774 B1* | 3/2016 | Choudhuri | ............. | G06Q 20/24 |
| 2004/0128256 A1* | 7/2004 | Krouse | .................. | G06Q 20/04 705/65 |
| 2009/0228365 A1* | 9/2009 | Tomchek | ............... | G06Q 10/00 705/21 |
| 2011/0161233 A1* | 6/2011 | Tieken | ................... | G06Q 20/04 705/71 |
| 2012/0330788 A1* | 12/2012 | Hanson | .................. | G06Q 30/06 705/26.41 |
| 2013/0151358 A1* | 6/2013 | Ramalingam | ............ | G07G 1/12 705/16 |
| 2013/0268340 A1* | 10/2013 | Colon | .................... | G06Q 40/08 705/14.25 |
| 2014/0129288 A1* | 5/2014 | Eager | ................. | G06Q 30/0185 705/7.29 |
| 2015/0066746 A1* | 3/2015 | Nichols | ............. | G06Q 20/3224 705/39 |

(Continued)

*Primary Examiner* — Allen C Chein
*Assistant Examiner* — Denisse Y Ortiz Roman
(74) *Attorney, Agent, or Firm* — Loeb & Loeb LLP

(57) ABSTRACT

In one embodiment, the location or zip code of purchasers in a card present electronic transaction may be reviewed and compared to the reported location or zip code of a merchant. If the difference or variance from the customer zip code or location to the customer location or zip code is over a threshold, the merchant is indicating as requiring additional attention.

1 Claim, 9 Drawing Sheets

(56) References Cited

U.S. PATENT DOCUMENTS

| | | | |
|---|---|---|---|
| 2016/0098702 A1* | 4/2016 | Marshall | G06Q 20/20 |
| | | | 705/44 |
| 2016/0140562 A1* | 5/2016 | Birukov | G06Q 20/3224 |
| | | | 705/39 |
| 2016/0171476 A1* | 6/2016 | Guan | G06Q 20/3224 |
| | | | 705/44 |
| 2017/0228635 A1* | 8/2017 | Diev | G06N 3/0481 |
| 2017/0345004 A1* | 11/2017 | Cowan | G06Q 20/20 |
| 2017/0364916 A1* | 12/2017 | Nidamanuri | G06Q 20/4016 |
| 2018/0053190 A1* | 2/2018 | Gurunathan | G06Q 20/388 |

\* cited by examiner

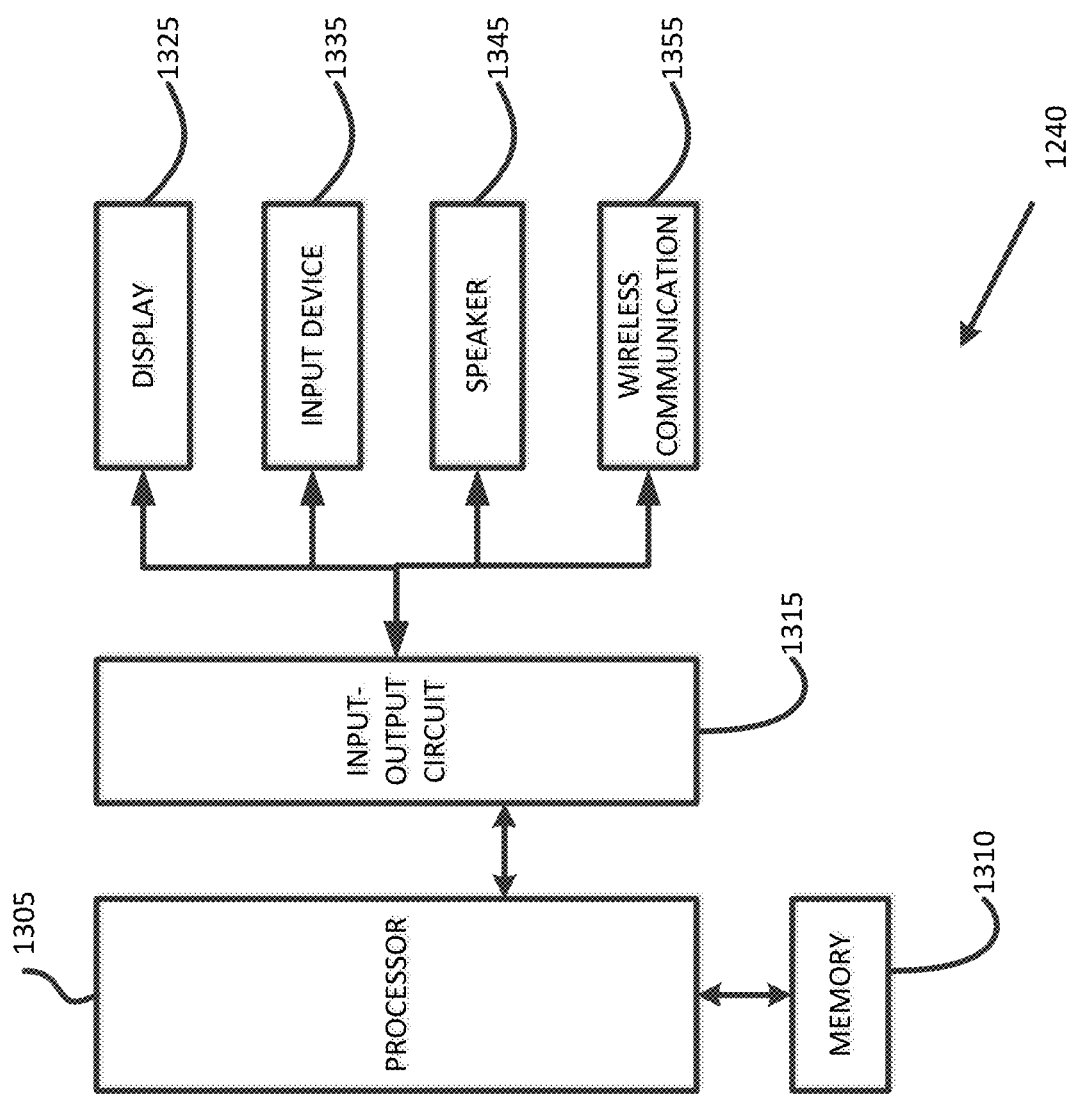

REPORTED LOCATION CORRECTION SYSTEM

BACKGROUND

When merchants are set up to receive payments over a payment network, merchants indicate a location zip code or location. However, some zip codes may be more favorable to a merchant than other zip codes for a variety of reasons, including tax rates and rates for accepting electronic payment devices like credit cards. Thus, sometime inaccurate zip codes or locations are used for merchants which may mean the merchants are gaining an advantage or that customers cannot be properly reviewed for fraudulent charges as zip codes for merchants and purchasers which should be close or similar may be artificially distant. In addition, card holders may be rejected on legitimate charges as the card holder zip code may not be sufficiently near the merchant zip code. Similarly, a merchant may receive an excessive amount of disputed claims related to zip code mismatches. It would be useful to have a way to verify or better determine a location or zip code for the merchant.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

In one embodiment, the location or zip code of purchasers in a card present electronic transaction may be reviewed and compared to the reported location or zip code of a merchant. If the difference or variance from the customer zip code or location to the customer location or zip code is over a threshold, the merchant is indicating as requiring additional attention. The variance may be determined in a variety of ways, from simple subtraction to machine learning algorithms.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 9 may illustrate the physical elements that may be used by a computing device.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
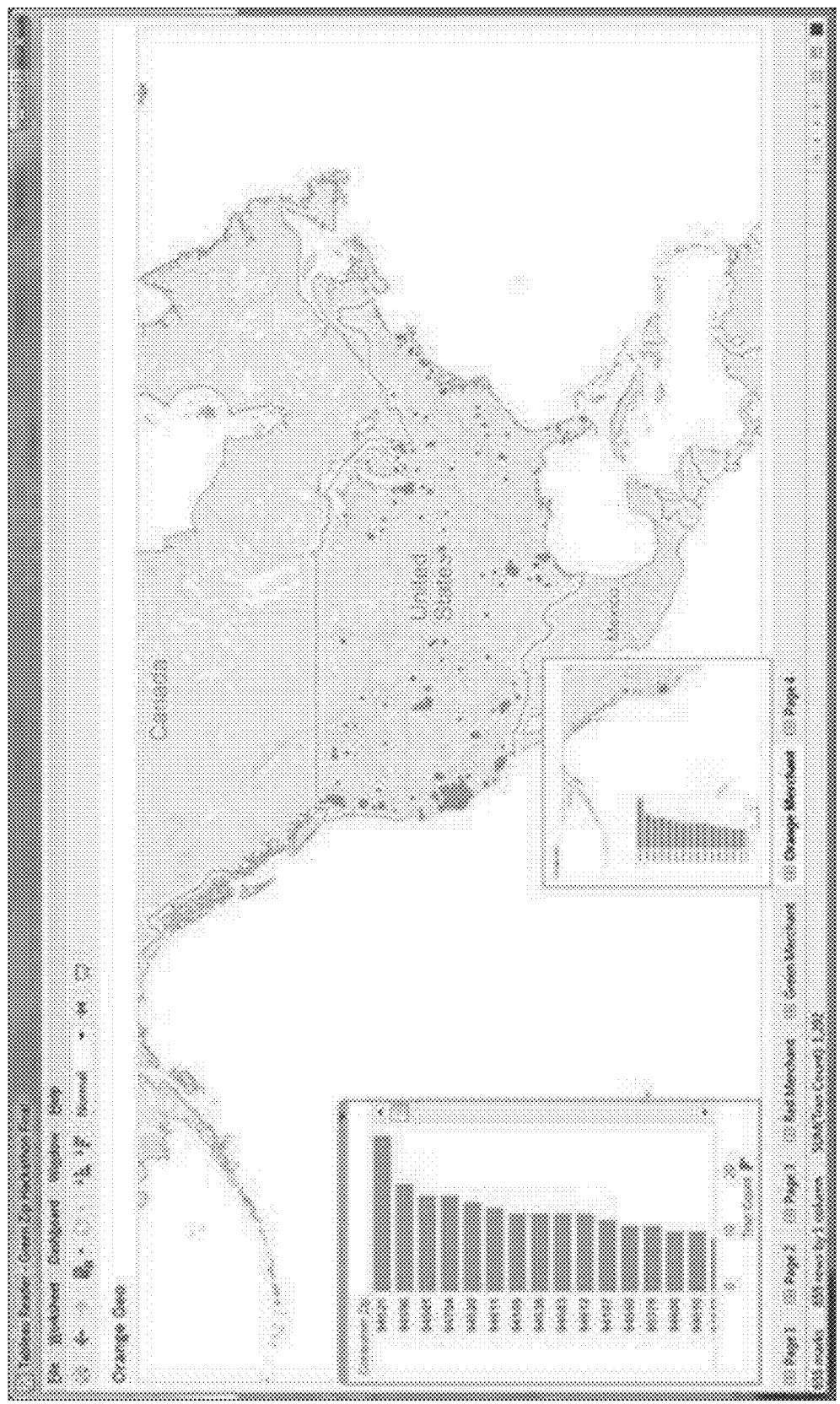
FIG. 1 illustrates the variety of zip codes that purchase at merchant.
Figure 2:
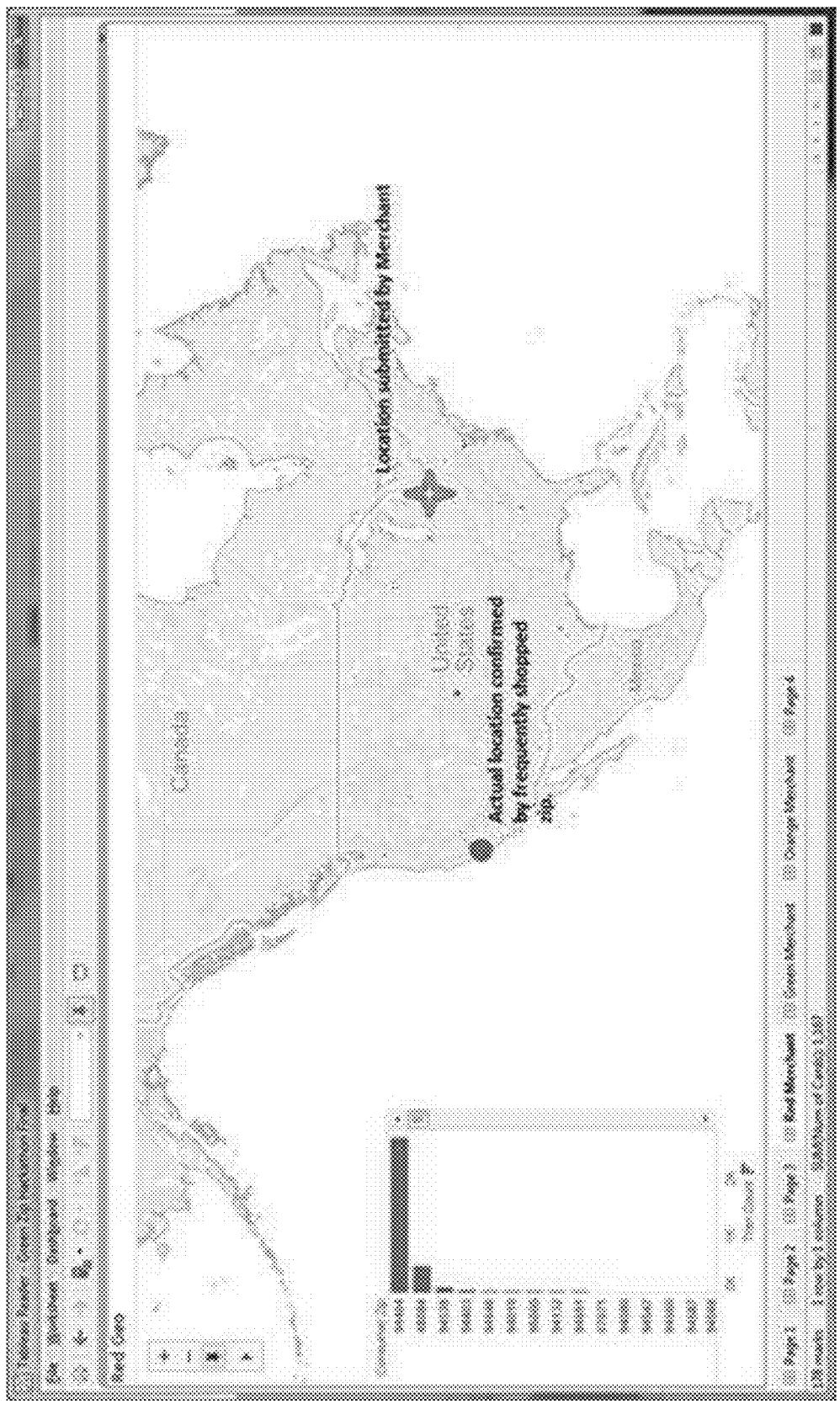
FIG. 2 illustrates an example where a submitted zip code does not match a frequently shopped zip code.

When merchants set up accounts to receive electronic payments such as credit card payments, debit payments, etc., the merchant indicates an address where the merchant may be located. As illustrated in FIGS. 1 and 2, sometimes, customers are from different locations so the location of the purchaser may be different than the location of the merchant. However, different locations of purchasers and merchants also may indicate that fraud is occurring. Similarly, loyalty programs may want to target customers that live near a brick and mortar store, rather than customers that are from locations remote from the brick and mortar store.

Trying to determine whether a vendor simply attracts customers from a variety of locations or that the vendor is routinely susceptible to fraud is a challenging, technical problem that requires a technical solution. If a fraud server begins to flag all transactions involving a customer with a location different than the merchant, sales may be lost. In the alternative, allowing fraudulent sales to occur costs everyone in the economic chain. Simply matching the zip code between a merchant and a purchaser is too simplistic to effectively address the problem. A more effective system and method is needed to evaluate locations of purchasers and merchants.

Figure 3:
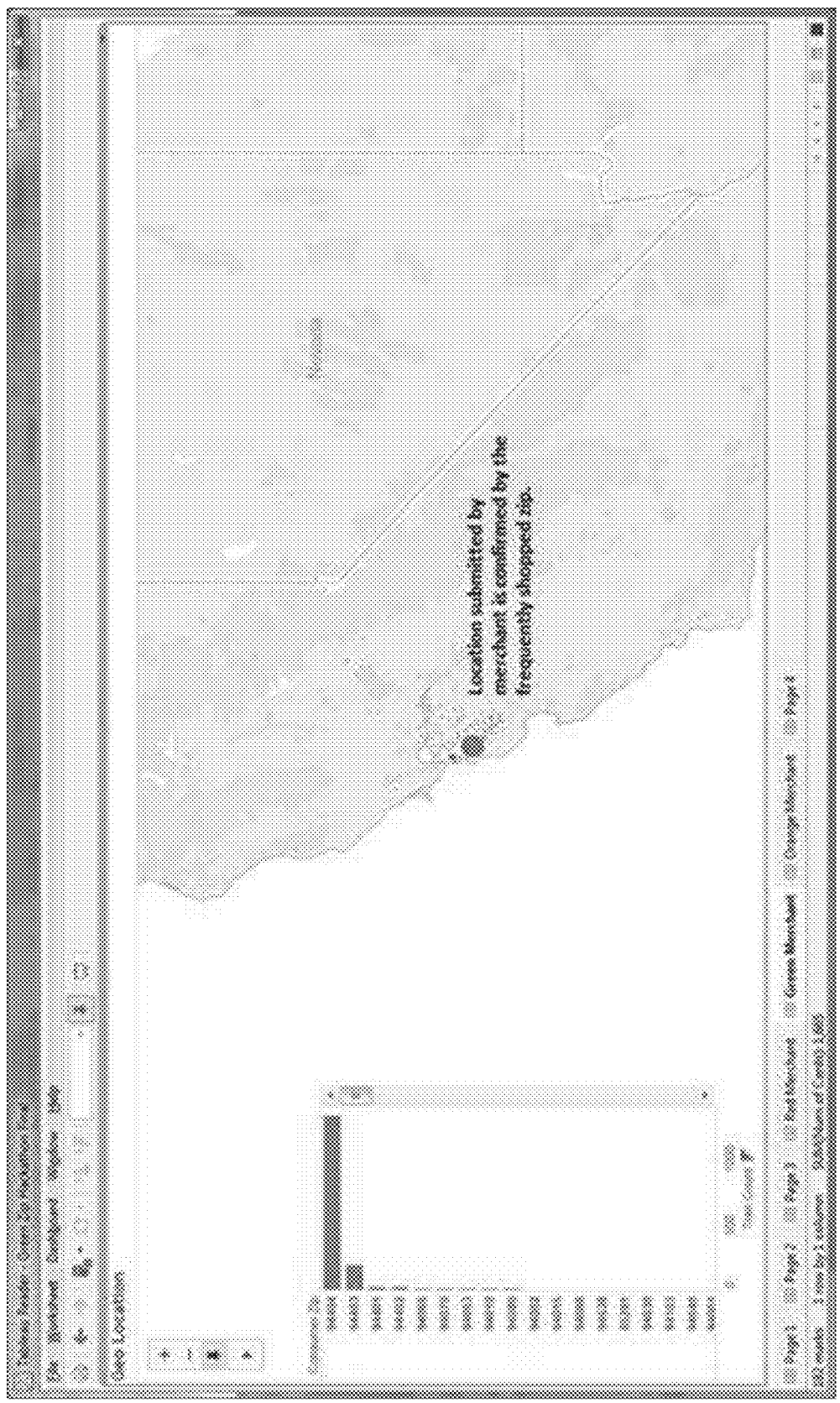
FIG. 3 illustrates an example where a submitted zip code matches a frequently shopped zip code.
Figure 5:
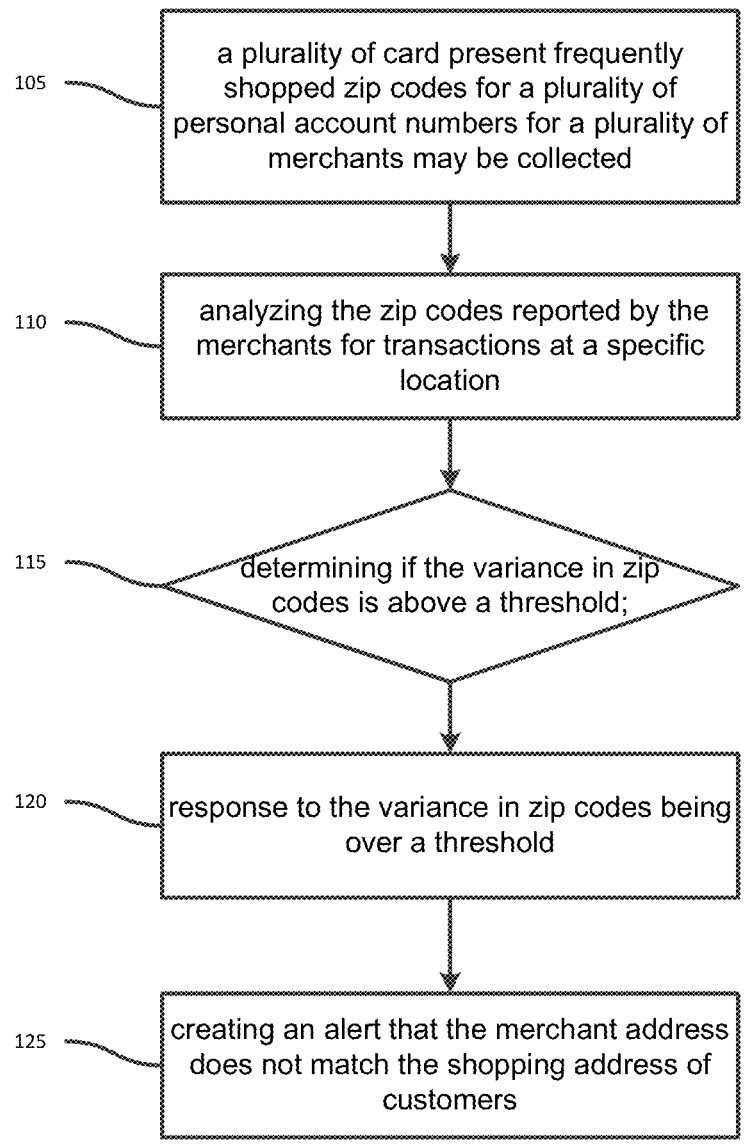
FIG. 5 illustrates a method of determining whether a reported merchant location is properly located.

FIG. 5 may illustrate blocks of an improved system and method of determining a location of point of sale to determine if a merchant zip code is confirmed by the frequently shopped zip code of purchasers as illustrated in FIG. 3. The method may be performed by one or more computing devices that are physically configured according to computer executable instructions to perform some or all of the blocks of the method.

At block 105, a plurality of card present frequently shopped zip codes for a plurality of personal account numbers for a plurality of merchants may be collected and stored in an electronic memory. The purpose of collecting the zip codes from the purchasers is to obtain a general idea of the area where each individual shops.

Of course, zip codes are only one way tracking and determining locations of purchasers. There are many other ways to track and determine locations where individuals make purchases. As an example and not limitation, GPS may be used to track and determine a location. In another example and not limitation, latitude and longitude of locations may be used. Logically, not all countries have zip code and different schemes of breaking down areas into smaller areas are known and are contemplated. Zip codes are well known and are easy to track and understand and will be used for the ease of the reader to describe a way to track locations of merchants and where purchases were made.

Obtaining the zip code of purchasers may be a challenge as zip code may not be commonly communicated at the time of purchase. It is true some merchants require zip codes to assist in authorizing a transaction but in a common transaction, the zip code of the purchaser may not be known. The zip code of purchasers may be acquired in a variety of ways. In some embodiments, the card issuer may have the zip code of the purchasers and it may be easy for the card issuer to obtain the zip codes. In some situations, the card issuer may have permission to share the zip codes with others and the availability of zip codes of purchasers may greatly expand the ability to study and use zip codes by a variety of people and organizations. In other situations, the issuing bank of the payment device such as the credit card issuing bank may have the zip codes available. Again, with sufficient permissions, the card issuing banks may be able to share the relevant zip code data, opening up the zip codes to others. Finally, third party providers may be able to match accounts to zip codes. Common providers include credit reporting agencies that collect large amounts of data on customers including zip codes. Again, the zip codes may be available for purchase by others.

Some transactions may be more meaningful for establishing an address than other transactions. Card present transactions, such as when a credit card or debit card is used at physical brick and mortar stores, may be especially useful as a card present transaction indicates that a consumer was at a physical location. In a situation where the card is not present such as a purchaser using a credit card over the internet, the location of the merchant may have a lower correlation to the location of the purchaser because the purchaser using the internet could easily be located at any location in relation to the merchant.

At block 110, the zip codes reported by the merchants for transactions at a specific location may be analyzed to determine the location of purchasers. In a basic analysis, the zip codes from purchasers are stored in a database and sorted. Logically, for card present transactions, an assumption may be made that the zip code of the purchasers should be close to the zip code of the merchant.

The manner of analyzing the data may be many and varied. In some embodiments, a simple count may be made and the zip code with the largest representation in the sample may be thought of as being the representative zip code of purchasers. Other statistical measures may be used such as mean, median and mode of the zip codes may also be used.

At block 110, the zip code of the merchant may be compared to the zip code of card present purchases. If the zip code of the merchant is the same as the zip code of the card present purchases, then a message that the zip code for the merchant is correct and the method may end. If the zip code for the merchant and the zip code for the customers are different, the method may continue to block 115.

At block 115, it may be determined if the variance in zip codes is above a threshold. The variance in zip codes may be determined in a variety of ways as will be discussed further in this patent. The threshold may be related to the manner of determining the variance and may be set by an authority or may be set through machine learning. Further, the threshold may vary based on the situation. For example, if the merchant or customers have zip codes in areas known for fraud, the threshold may be lower.

At block 120, in response to the variance in zip codes being determined to be over a threshold, an alert may be created that the merchant address does not match the shopping address of customers. The alert may be a communication such as an email or a report. In other embodiments, the alert may be a directive to do something in response to the zip code mismatch issue such as send out an investigator, change the zip code of the merchant, contact the merchant for more information, etc.

Figure 6:
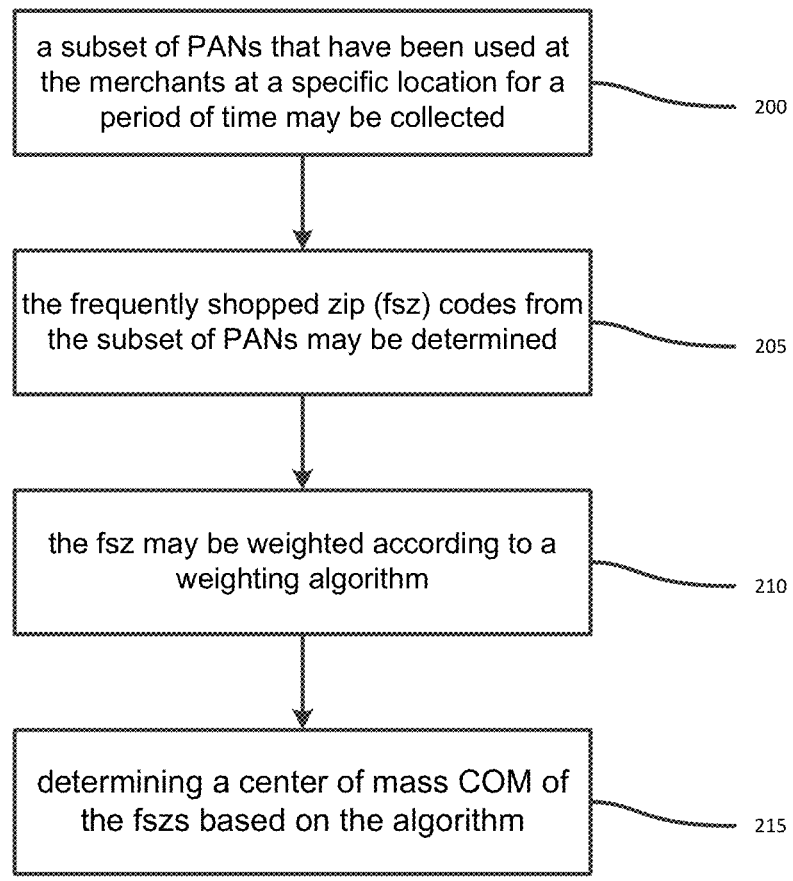
FIG. 6 illustrates a manner of determining the center of mass of frequently shopped zip codes.

There may be a variety of ways of determining if the variance is over a threshold. FIG. 6 may illustrate one manner of determining the variance. Referring to FIG. 6, at block 200, a subset of Personal Account Numbers (PANs) that have been used at the merchants at a specific location for a period of time may be collected. The PANs may be stored in a memory. Again, receiving actual PAN is difficult and few organizations have access to PANs. However, for the organizations that do have the PAN, the analysis may be easier and more meaningful.

At block 205, the frequently shopped zip (fsz) codes from the subset of PANs may be determined. Logically, consumers often shop in different zip codes. As an example, a consumer may shop near home, near work, near a health club, etc., and each of the locations may have different zip codes. Further, consumers may shop more at certain zip codes than others. As an example, one family may shop at a discount store in a first zip code and another family may shop at upscale retailers in a different zip code. In one embodiment, the number of transactions may be used to determine the frequently shopped zip code. In another embodiment, the number of items purchased may be used to determine the frequently shopped zip code. In yet another embodiment, the dollar volume may be used to determine the frequently shopped zip code.

At block 210, the frequently shopped zip code may be weighted according to a weighting algorithm. The weighting algorithm may take on a variety of forms which may relate to the manner the frequently shopped zip code was determined. For example, if the frequently shopped zip code is determined using the transactions, then the transactions may be weighted by the dollar amount. In another embodiment, the time of day may be used to weight the frequently shopped zip codes. As an example, a frequently shopped zip code around lunch time will likely be away from a customer's home as the customer is at work. On the other hand, a purchase early in the morning may be near a customer's home.

Figure 4:
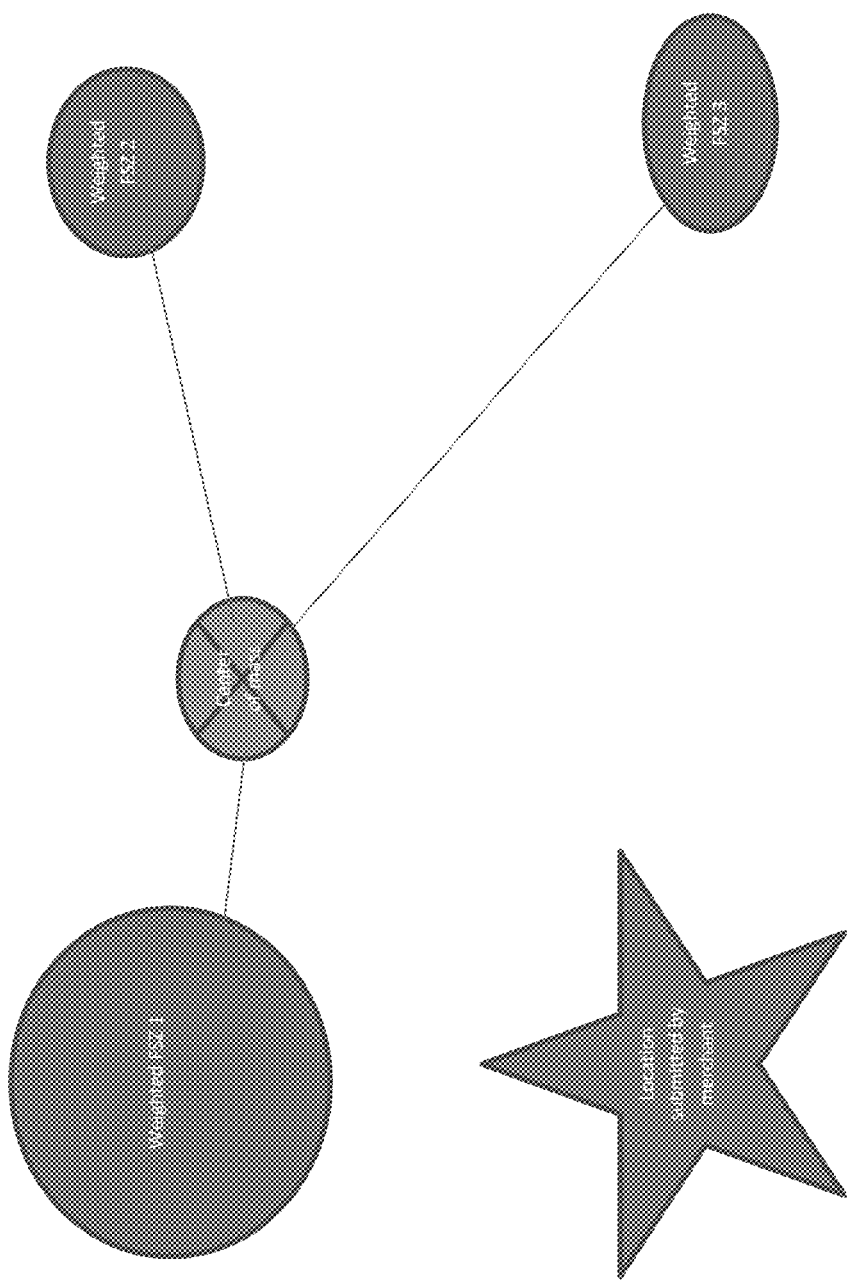
FIG. 4 illustrates a center of mass of frequently shopped locations being at a different location than the submitted merchant location.

At block 215, a center of mass (COM) of the frequently shopped zip codes may be determined based on the algorithm as illustrated in FIG. 4. The center of mass algorithm may take on a plurality of forms and may attempt to determine a center of the zip codes where a consumer made a card present purchase. Finding the center of mass may entail finding a point which is the total minimum distance from all of the frequently shopped zip code. In other words, the point should be at the center of the various frequently shopped zip codes.

Figure 7:
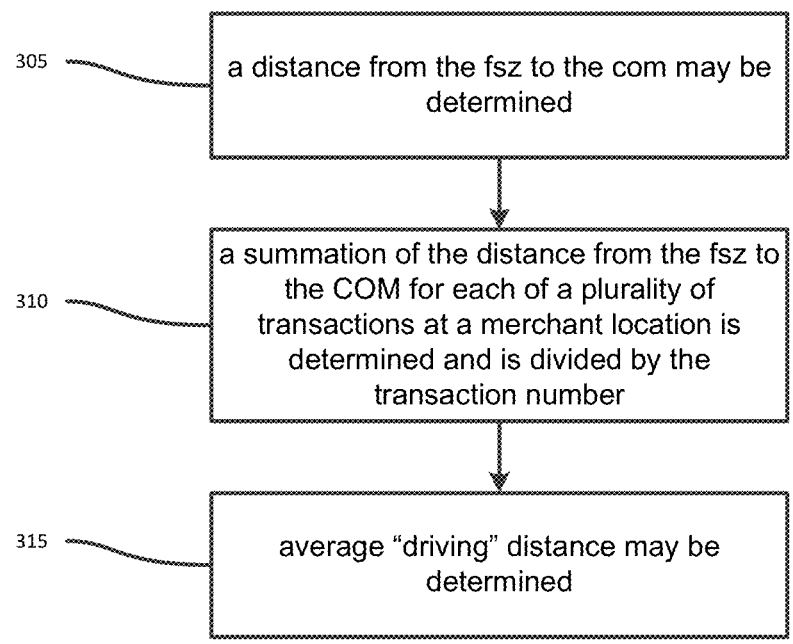
FIG. 7 determines an average driving distance for a consumer.

FIG. 7 may illustrate another manner of determining if the variance is over a threshold. In the model of FIG. 7, the average transportation distance for a transaction may be measured and used to help determine variance. At block 300, a transaction number may be determined where the transaction number may include a total number of transactions for the location for the merchant.

At block 305, a distance from the frequently shopped zip code to the center of mass may be determined. The distance may be determined in a variety of ways. In one embodiment, a lookup table may be used where the distances between the locations may be determined. In another embodiment, a mapping application may be used wherein the frequently shopped zip code and center of mass are submitted to the mapping application and a distance between the frequently shopped zip code and center of mass may be determined.

At block 310, a summation of the distance from the frequently shopped zip code to the center of mass for each of a plurality of transactions at a merchant location may be determined and may be divided by the transaction number.

At block 315, an average "driving" distance may be determined according to the formula:

$$:1/(\text{total number of transactions})*\text{sum}(R*N\_\text{of\_transactions}),$$

where R is the distance from frequently shopped zip code to the center of mass.

The usefulness of the average driving distance to help establish if the merchant zip code is correct. If the average driving distance is below the distance from the center of mass (or frequently shopped zip code), it may be likely that the variance is unacceptably large and the merchant zip code is incorrect. If the merchant zip code falls in the average driving distance from the center of mass (or the frequently shopped zip codes), the merchant zip code may be determined to be acceptable.

Figure 8:
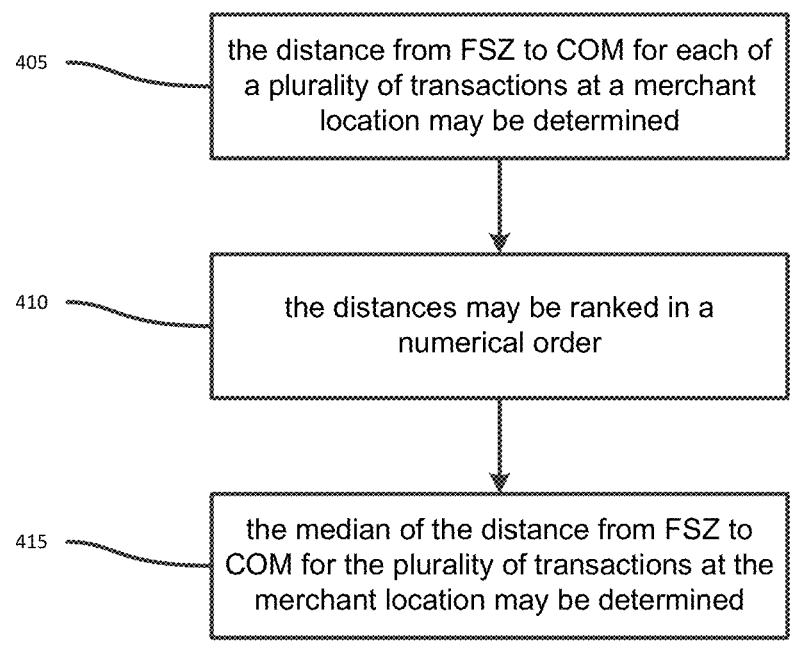
FIG. 8 illustrates a manner of determining the median of a distance from a center of mass to an frequently shopped zip code.

FIG. 8 may illustrate another manner of determining if the variance is over a threshold. The manner may involve determining the median absolute deviation. The method of determining the median absolute deviation (MAD) may include the following steps.

At block 405, the distance from frequently shopped zip code to center of mass for each of a plurality of transactions at a merchant location may be determined. The distance may be determined in a variety of ways. In one embodiment, a lookup table may be used where the distances between the locations may be determined. In another embodiment, a mapping application may be used wherein the frequently shopped zip code and center of mass are submitted to the mapping application and a distance between the frequently shopped zip code and center of mass may be determined.

At block 410, the distances may be ranked in a numerical order. At block 415, the median of the distance from frequently shopped zip code to center of mass for the plurality of transactions at the merchant location may be determined.

MAD=median (R), where R is the distance from frequently shopped zip code to the center of mass.

MAD may be considered a robust measure of statistical dispersion. It may be more resilient to outliers than standard deviation or sample variance. The larger the MAD is, the more dispersed data may be.

The median may be more meaningful that the mode or average as the middle location (the median) may eliminate the outlying distances and focus on the central distance.

In another manner of determining the distance between frequently shopped zip code and center of mass, the weighted Gaussian entropy of the location data may be determined according to the following formula:

$$k/2(1+\ln(2\pi))+\tfrac{1}{2}\ln|\Sigma|, \text{ wherein}$$

k denotes dimension, and $|\Sigma|$ denotes determinant of covariance matrix.

A bivariate Gaussian Distribution may represent a distribution of latitude and longitude of frequently shopped zip codes and the larger the WGE is, the more dispersed the data.

Using WGE, the method may determine a number of dense clusters where the greater the number of clusters may lead to the conclusion that the data is more dispersed. The dispersion of clusters may be further determined by applying Density Based Spatial Clustering with Application to Noise (DBSCAN). The DBSCAN may be a density based clustering algorithm, which given a set of points and two parameters required: ε (eps) and the minimum number of points required to form a dense region (minPts):

groups together points that are closely packed together, and marks as outliers points that lie alone in low-density regions.

It does not require the number of clusters, and can find non-linear separable clusters, which can't be achieved by Gaussian Mixtures or K-Means. Two parameters required: ε (eps) and the minimum number of points required to form a dense region (minPts).

Another way to determine the variance and whether the variance is over a threshold may use Average Absolute Deviation (AAD). The AAD may be calculated of the center of mass to the frequently shopped zip codes. Determining the AAD may include applying the formula comprising:

$$\text{AAD}=1/n\Sigma|R|, \text{ where}$$

R is the distance from the DBSCAN core point to center of mass which may indicate how the DBSCAN core locations are centered regarding the center of mass.

In general, high deviation which does not include the merchant location may indicate that the merchant zip code is not correct while a low deviation may include the merchant location may indicate that the merchant zip code is correct.

Machine learning also may be used to analyze and classify the locations. Random Forest and AdaBoost may be sample classification ML algorithms which may be used. The training/test data may be manually created. The machine learning for classification may be undertaken offline. The classification may be undertaken periodically (as the changes to the merchants' setup are not frequent) and the result of the classification may be stored in a database.

The entire process may be an adaptive/iterative approach which may exclude merchants with incorrectly reported locations from frequently shopped zip calculations. In this way, the determination of the proper zip code may be further improved as improper zip codes will not affect future calculations.

FIG. 9 may illustrate the physical elements that may be used by a computing device 1240. The computing device 1240 may be portable and may have a processor 1305 which may be physically configured according to computer executable instructions. A memory 1310 may be in communication with the processor 1305 and the memory may store the portable computing device ids, the verification codes and other data that may be useful to the processor 1305. The processor 1305 may be in communication with an input-output circuit 1315 which may manage communications to and from the processor 1305. The input-output circuit 1315 may be in communication with a display 1325 which may be touch sensitive. The input-output circuit 1315 may be in communication with an input device 1335 which may be a keyboard, touchpad, etc. The input-output circuit 1315 may be in communication with a speaker 1345 which may be used to communicate messages to the user by voice. The input-output circuit 1315 may be in communication with a wireless communication circuit which may be used to communicate wirelessly in a variety of forms such as via Bluetooth, WiFi, cellular, or any other appropriate RF communication form and format.

The merchant classification data can be used to classify the merchants. If there are no issues such as the variance between the com and frequently shopped zip code being below the threshold, the merchant may be classified as green or no problem. If the variance between the com and frequently shopped zip code is near or over the threshold, the merchant may be classified as yellow or a slight problem. If the variance between the com and frequently shopped zip code is above the threshold, the merchant may be classified as red. It may be noted that Red merchants may be excluded from future frequently shopped zip code calculations.

The user devices, computers and servers described herein may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s). The servers may be adept at processing large amounts of data and may use specialized software and hardware in addition to traditional tools like Hadoop.

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

It also should be noted that each block described herein may be performed by a specific server specifically designed for that purpose. For example, there may be a collection server which collects a plurality of card present frequently shopped zip codes for a plurality of personal account numbers for a plurality of merchants, an analysis server which analyzes the zip codes reported by the merchants for transactions at a specific location, a determination server which determines if the variance in zip codes is above a threshold and a communication server which in response to the variance in zip codes being over a threshold creates an alert that the merchant address does not match the shopping address of customers. Further, some servers may be able to handle more than one task while other task may be extremely computationally intensive and may be spread over numerous servers.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving payment systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer system for determining a location of point of sale comprising:
   a collection server which is physically configured to, for a plurality of electronic transactions at a plurality of merchants, collect a plurality of card present frequently shopped zip codes for a plurality of personal account numbers wherein each of the plurality of merchants includes a reported zip code indicating a location of each of the plurality of merchants, and at least one of the plurality of card present frequently shopped zip codes matches at least one of the reported zip codes;
   an analysis server which is physically configured to analyze the reported zip code for each of the plurality of merchants for transactions at a specific merchant location;
   a determination server which is physically configured to determine if a variance in the plurality of card present frequently shopped zip codes for a personal account number (PAN) of the plurality of personal account numbers and the reported zip code for a merchant of the plurality of merchants is above a threshold; and
   a communication server which, in response to the variance being over a threshold, is physically configured to create an alert indicating that the location of a merchant of the plurality of merchants does not match a card present frequently shopped zip code;
   wherein determining if the variance is over a threshold further comprises determining the weighted Gaussian Entropy (WGE) according to the formula:

$k2(1+\ln(2\pi))+½ \ln |\Sigma|$, wherein k denotes dimension,
   $|\Sigma|$ denotes determinant of covariance matrix, and wherein
   a bivariate Gaussian distribution represents distribution of latitude and longitude of the card present frequently shopped zip codes.

* * * * *